(12) United States Patent
Brigham

(10) Patent No.: US 11,635,164 B2
(45) Date of Patent: Apr. 25, 2023

(54) CLAMP COVER AND A METHOD OF USE

(71) Applicant: Graham Brigham, Sherwood Park (CA)

(72) Inventor: Graham Brigham, Sherwood Park (CA)

( * ) Notice: Subject to any disclaimer, the term of this patent is extended or adjusted under 35 U.S.C. 154(b) by 70 days.

(21) Appl. No.: 16/599,386

(22) Filed: Oct. 11, 2019

(65) Prior Publication Data

US 2021/0108756 A1 Apr. 15, 2021

(51) Int. Cl.
*F16L 59/14* (2006.01)
*F16L 59/16* (2006.01)
*F16L 59/10* (2006.01)

(52) U.S. Cl.
CPC ............. *F16L 59/14* (2013.01); *F16L 59/106* (2013.01); *F16L 59/168* (2013.01)

(58) Field of Classification Search
None
See application file for complete search history.

(56) References Cited

U.S. PATENT DOCUMENTS

| | | | |
|---|---|---|---|
| 3,244,388 A | 4/1966 | Coffman | |
| 4,103,701 A * | 8/1978 | Jeng | E03B 7/12 137/375 |
| 5,958,571 A * | 9/1999 | Omura | F16J 15/122 428/316.6 |
| 2005/0081934 A1 | 4/2005 | Douglas et al. | |
| 2006/0012164 A1* | 1/2006 | Douglas | F16L 59/106 285/45 |
| 2011/0222963 A1 | 9/2011 | Kelley et al. | |
| 2012/0251788 A1* | 10/2012 | Hanley | F01M 11/0004 428/167 |
| 2013/0248039 A1 | 9/2013 | Bourlart | |

\* cited by examiner

*Primary Examiner* — Alexander S Thomas
(74) *Attorney, Agent, or Firm* — Finch & Maloney PLLC

(57) ABSTRACT

A pipeline clamp cover has a body and a flange. The body has a front face in sealing engagement with at least one peripheral side wall such that an enclosure having a rear opening is formed. The flange is provided in sealing engagement with a bottom edge of the at least one peripheral side wall and extends outwards away from the body.

12 Claims, 6 Drawing Sheets

CLAMP COVER AND A METHOD OF USE

FIELD OF THE DISCLOSURE

The present application relates generally to a clamp cover for use in sealing protrusions around pipe clamps.

BACKGROUND

This section provides background information to facilitate a better understanding of the various aspects of the invention. It should be understood that the statements in this section of this document are to be read in this light, and not as admissions of prior art.

The task of attempting to install cladding around pipe clamps on insulated piping systems has traditionally been very difficult. Excessive amounts of time from skilled tradespeople can be required to complete the install and often the sealing components have a severely limited lifespan.

BRIEF SUMMARY

There is provided a pipeline clamp cover having a body and a flange. The body has a front face in sealing engagement with at least one peripheral side wall such that an enclosure having a rear opening is formed. The flange is provided in sealing engagement with a bottom edge of the at least one peripheral side wall and extending outwards away from the body.

In one embodiment, the body is made of an ethylene propylene diene monomer rubber. The rubber has some flexibility to allow body some flexibility to shape to the curvature of the pipeline system onto which the body is placed.

In one embodiment, the flange is made of an ethylene propylene diene monomer rubber. The rubber has some flexibility to allow flange some flexibility to shape to the curvature of the pipeline system onto which the flange is placed.

In one embodiment, a gasket is positioned on a bottom surface of the flange and acts as a sealing membrane. The gasket may be made of steel or any other suitable material. In one embodiment, the gasket is made of 18 gauge steel.

In one embodiment, the enclosure is substantially rectangular in shape. It will be understood by a person skilled in the art that enclosure may be any other suitable shape.

In one embodiment, the flange has at least one aperture. The at least one aperture are used to allow screws or other suitable attachments to be used when attaching the flange to a pipeline system.

In one embodiment, the front face and the at least one peripheral side wall are integrally formed.

In one embodiment, the enclosure and the flange are integrally formed.

There is also provided a method of sealing a protrusion of a piping system. A pipeline clamp cover is provided. The pipeline clamp cover has a body and a flange. The body has a front face in sealing engagement with at least one peripheral side wall such that an enclosure having a rear opening is formed. The flange is provided in sealing engagement with a bottom edge of the at least one peripheral side wall and extending outwards away from the body. The enclosure is positioned over the protrusion on the piping system such that the flange contacts the piping system. The flange is attached to the piping system.

In one embodiment, the body is made of an ethylene propylene diene monomer rubber. The rubber has some flexibility to allow body some flexibility to shape to the curvature of the pipeline system onto which the body is placed.

In one embodiment, the flange is made of an ethylene propylene diene monomer rubber. The rubber has some flexibility to allow flange some flexibility to shape to the curvature of the pipeline system onto which the flange is placed.

In one embodiment, a gasket is positioned on a bottom surface of the flange and acts as a sealing membrane. The gasket may be made of steel or any other suitable material. In one embodiment, the gasket is made of 18 gauge steel.

In one embodiment, the enclosure is substantially rectangular in shape. It will be understood by a person skilled in the art that enclosure may be any other suitable shape.

In one embodiment, the flange has at least one aperture. The at least one aperture are used to allow screws or other suitable attachments to be used when attaching the flange to a pipeline system.

In one embodiment, the front face and the at least one peripheral side wall are integrally formed.

In one embodiment, the enclosure and the flange are integrally formed.

In one embodiment, a further step of sealing an outer edge of the flange to the pipeline system using a sealant is taken after the flange is attached to the pipeline system.

In one embodiment, the sealant is a silicone sealant.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
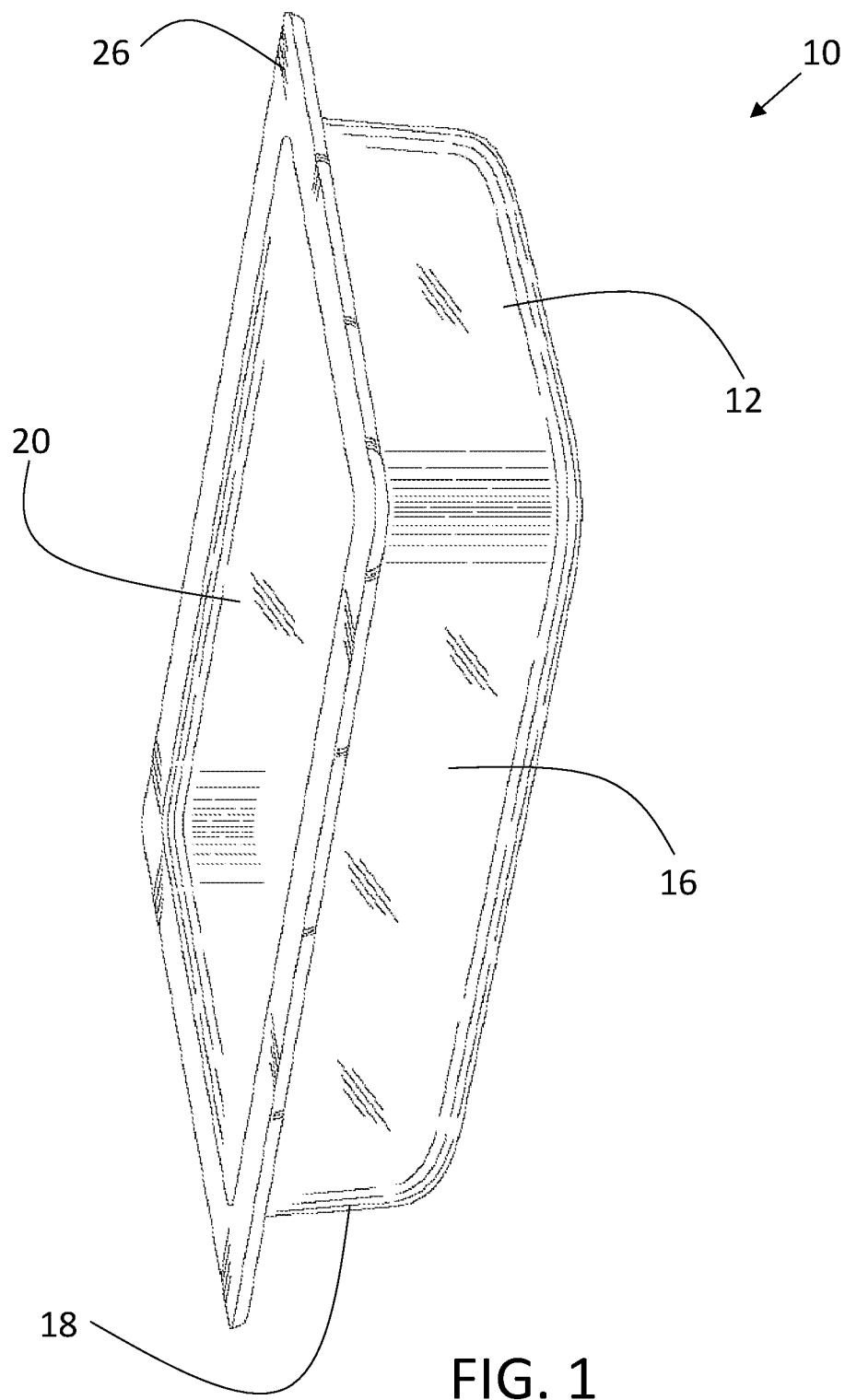
FIG. 1 is a perspective view of a clamp cover.
Figure 2:
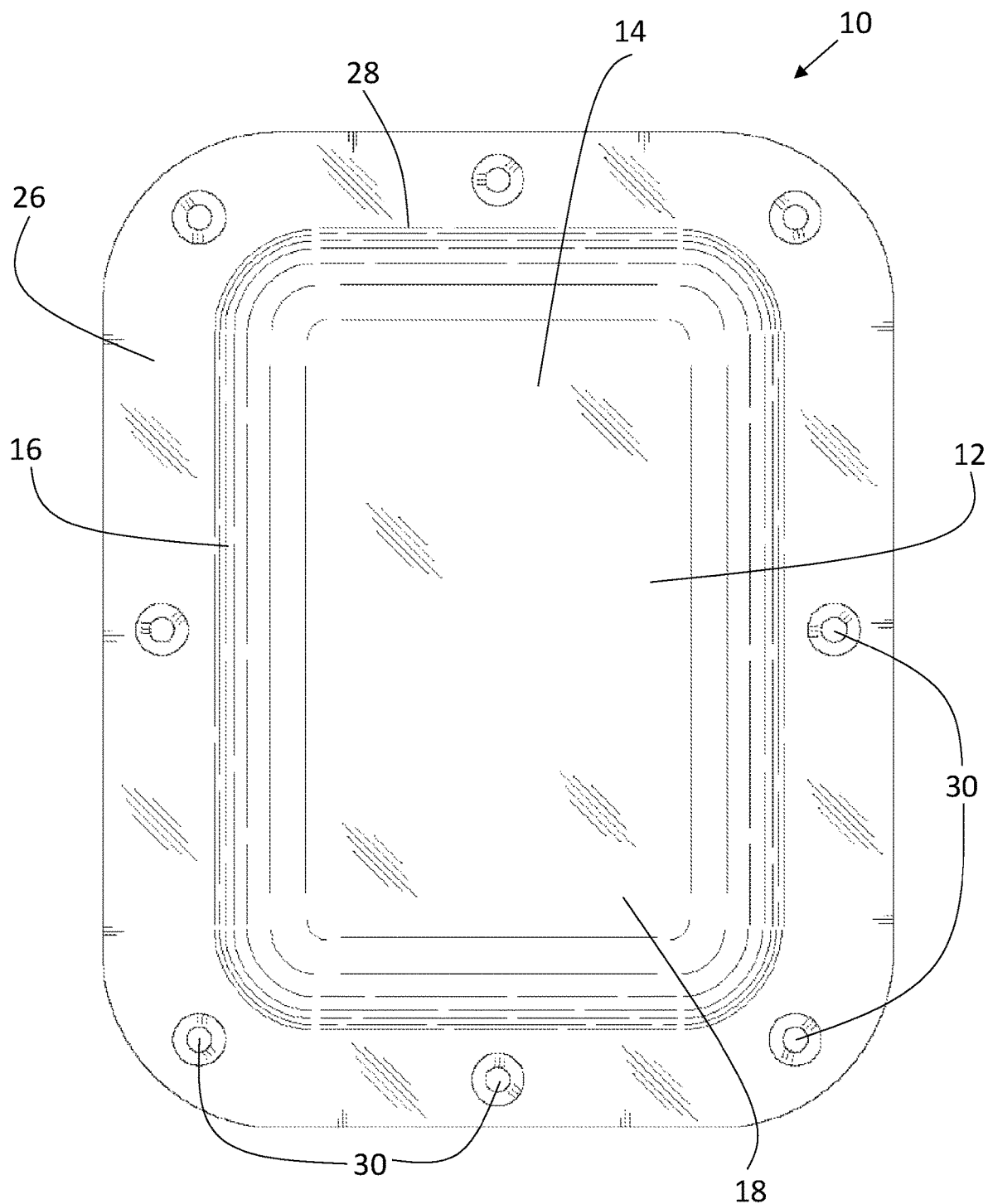
FIG. 2 is a front elevation view of the clamp cover shown in FIG. 1.

A clamp cover, generally identified by reference numeral 10, will now be described with reference to FIG. 1 through FIG. 6.

A clamp cover 10 has a body 12 with a front face 14 in sealing engagement with at least one peripheral side wall 16. Front face 14 and peripheral side walls 16 form an enclosure 18 that has a rear opening 20. In the embodiment shown, enclosure 18 is substantially rectangular in shape, however it will be understood by a person skilled in the art that the shape of enclosure 18 may vary depending upon the size and shape of the protrusion that is being sealed on pipeline system 22, shown in FIG. 6. In the embodiment shown in FIG. 6, clamp cover 10 is used to seal around pipe clamps 24 on pipeline system 22. To provide a seal, a flange 26 is provided in sealing engagement with a bottom edge 28 of peripheral side walls 16. Flange 26 extends outwards away from body 12.

In one embodiment, body 12 and flange 26 are made of an ethylene propylene diene monomer rubber. This allows body 12 and flange 26 to be flexible and shape itself to the curvature of pipeline system 22. This allows clamp cover 10 to be used on pipeline systems 22 with different curvatures. In the embodiment shown in FIG. 2 and FIG. 3, flange 26 has apertures 30 that allow a screw 32, nail or other suitable attachments, shown in FIG. 6, to be used to attach flange 26 to pipeline system 22, shown in FIG. 6.

Figure 3:
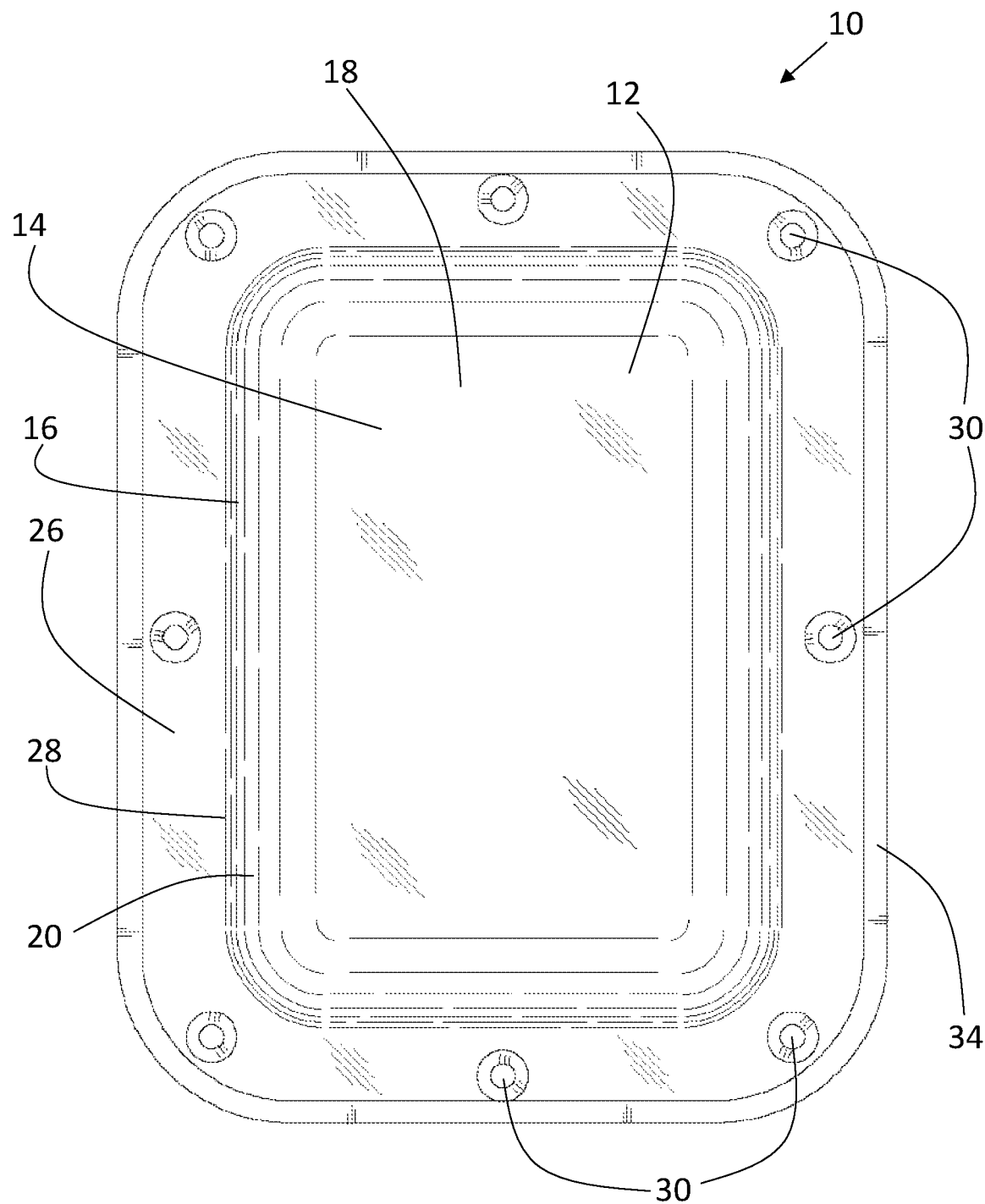
FIG. 3 is a rear elevation view of the clamp cover shown in FIG. 1.
Figure 4:
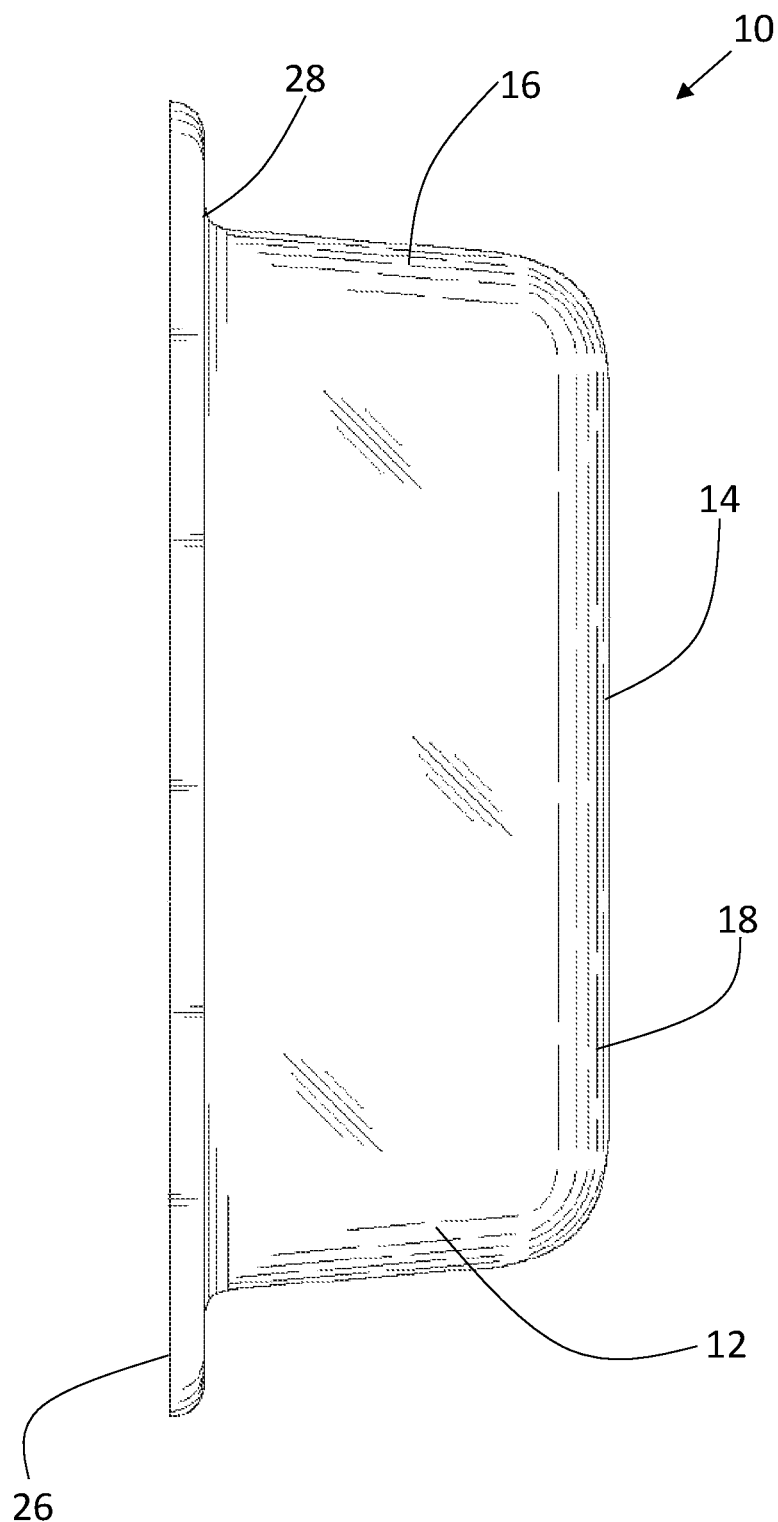
FIG. 4 is a side elevation view of the clamp cover shown in FIG. 1.
Figure 5:
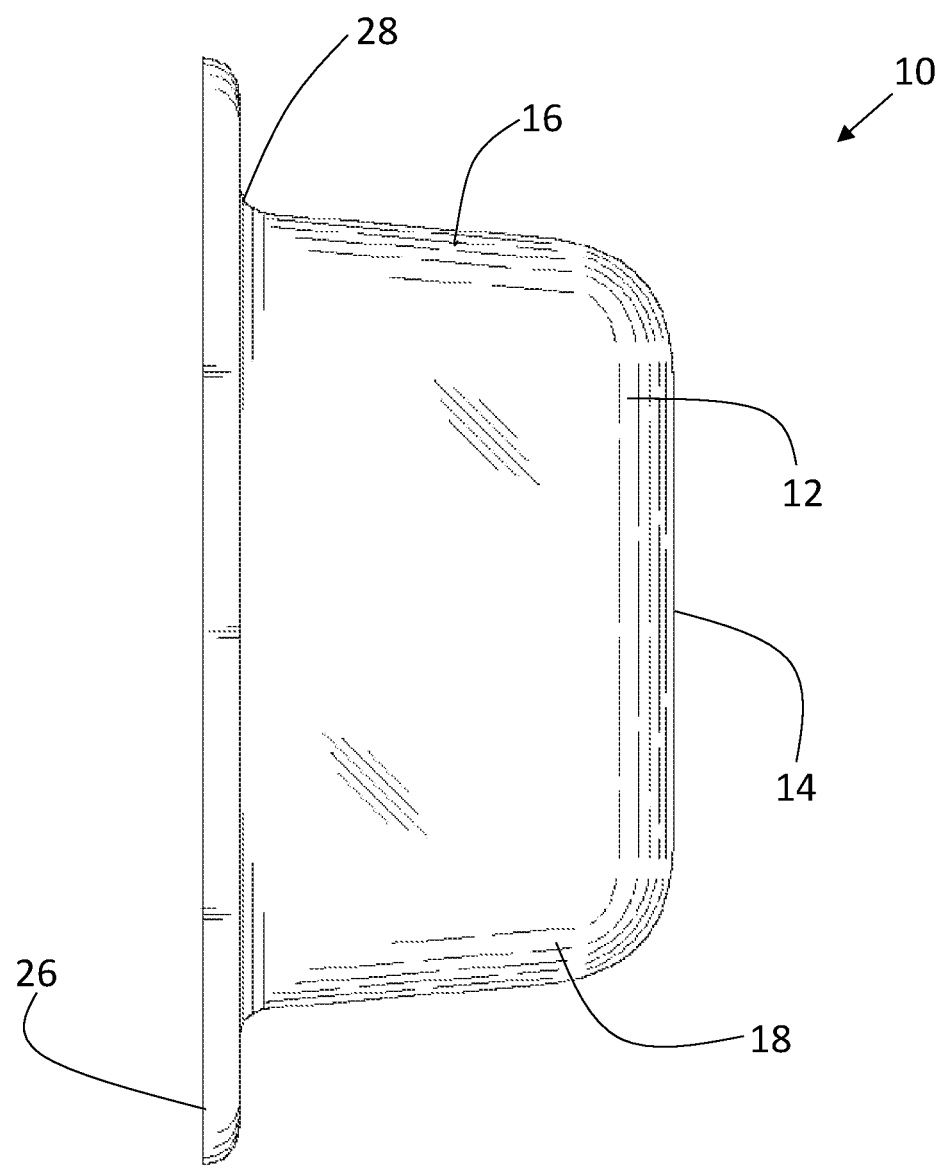
FIG. 5 is a top elevation view of the clamp cover shown in FIG. 1.

In the embodiment shown in FIG. 3, a gasket 34 is positioned on a bottom surface of flange 26. In the embodiment shown, gasket 30 is made of 18 gauge steel, however it will be understood by a person skilled in the art that gasket 30 may be made of any other suitable material.

To improve sealing and reduce the risks of leaking, front face 14 and peripheral side walls 16 may be integrally formed. Additional sealing benefits may be seen when enclosure 18 and flange 26 integrally formed.

Figure 6:
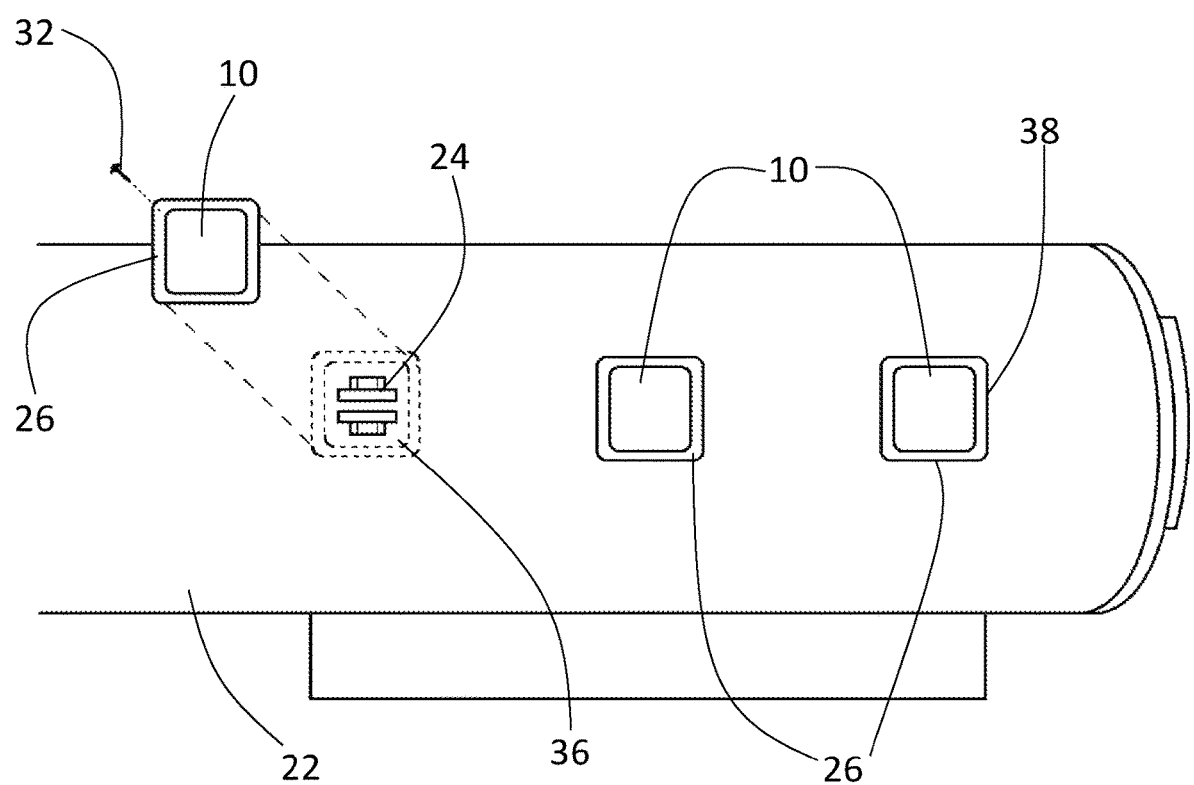
FIG. 6 is a perspective view of a pipe with clamp covers.

Referring to FIG. 6, clamp cover 10 is used to seal protrusions such as pipe clamps 24 on piping system 22. As can be seen, pipe clamps 24 extend outwards from piping system 22 through an aperture 36. Clamp cover 10 is positioned over pipe clamps 24 such that flange 26 contacts piping system 22 around an exterior of aperture 36. Flange 26 is attached to piping system 22 by any means known to a person skilled in the art. In the embodiment shown, screws 32 are used to screw flange 26 to piping system 22.

Gasket 34, shown in FIG. 3, may help to provide an improved seal between flange 26 and piping system 22. A further step of sealing an outer edge 38 of flange 26 to pipeline system 22 using a sealant. Sealant may be a silicone sealant or any other suitable sealant known to a person skilled in the art.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A pipeline clamp cover in combination with a piping system, the piping system comprising at least one pipe clamp located within an aperture, the pipeline clamp cover comprising:
    a flexible body having a front face in sealing engagement with at least one peripheral side wall such that the flexible body and the at least one peripheral side wall form an enclosure having a rear opening; and
    a flexible flange in sealing engagement with an entire bottom edge of the at least one peripheral side wall and extending outwards away from the flexible body,
    the flexible flange, prior to installation, lying in and defining a plane,
    the flexible flange and the flexible body, due to their flexibility, permitting the flexible flange to adapt and conform to a curved outer surface of the piping system and thereby form a seal between the flexible flange and an entire perimeter of the aperture on the curved outer surface of the piping system, and the flexible body and the flexible flange, due to their flexibility, being conformable to varying diameter curvatures of the outer surface of the pipeline system.

2. The pipeline clamp cover of claim 1 wherein the flexible body is made of an ethylene propylene diene monomer rubber.

3. The pipeline clamp cover of claim 1 wherein the flexible flange is made of an ethylene propylene diene monomer rubber.

4. The pipeline clamp cover of claim 1 wherein a gasket is positioned on a bottom surface of the flexible flange.

5. The pipeline clamp cover of claim 4 wherein the gasket is made of steel.

6. The pipeline clamp cover of claim 5 wherein the gasket is made of 18 gauge steel.

7. The pipeline clamp cover of claim 1 wherein the enclosure is substantially rectangular in shape.

8. The pipeline clamp cover of claim 1 wherein the flexible flange has at least one aperture.

9. The pipeline claim cover of claim 1 wherein the front face and the at least one peripheral side wall are integrally formed.

10. The pipeline claim cover of claim 9 wherein the enclosure and the flexible flange are integrally formed.

11. A pipeline clamp cover in combination with a piping system, and the piping system comprising a pipe clamp located within an aperture formed in a curved outer surface of the piping system, the pipeline clamp cover comprising:
    a flexible body having a front face in sealing engagement with at least one peripheral side wall such that the flexible body and the at least one peripheral side wall form an enclosure having a rear opening;
    a flexible flange in sealing engagement with an entire bottom edge of the at least one peripheral side wall and extending outwards away from the flexible body; and
    the flexible flange, prior to installation, lying in and defining a plane;
    the flexible flange and the flexible body, due to their flexibility, permitting the flexible flange and the flexible body to enclose the pipe clamp and the aperture with the flexible flange adapting and conforming to the curved outer surface of the piping system so that a seal is formed between the flexible flange and an entire exterior perimeter of the aperture formed in the curved outer surface of the piping system, and
    the flexible body and the flexible flange, due to their flexibility, being conformable to varying diameter curvatures of the outer surface of the pipeline system.

12. A single pipeline clamp cover in combination with a piping system, and the piping system comprising a pipe clamp located within an aperture formed in a curved outer surface of the piping system, the pipeline clamp cover comprising:

a flexible body having a front face in sealing engagement with a peripheral side wall such that the flexible body and the peripheral side wall form an enclosure having a rear opening;

a flexible flange in sealing engagement with an entire bottom edge of the peripheral side wall and extending outwards away from the flexible body; and the flexible flange, prior to installation, lying in and defining a plane;

the flexible flange and the flexible body, due to their size and flexibility, permitting the flexible flange and the flexible body to enclose only the pipe clamp and the aperture, without surrounding an entire circumference of the curved outer surface of the piping system, and adapt and conform to the curved outer surface of the piping system so that a seal is formed between the flexible flange and an entire exterior perimeter of the aperture formed in the curved outer surface of the piping system, and the flexible body and the flexible flange, due to their flexibility, being conformable to varying diameter curvatures of the outer surface of the pipeline system.

\* \* \* \* \*